(12) United States Patent
Favreau

(10) Patent No.: US 6,433,702 B1
(45) Date of Patent: Aug. 13, 2002

(54) FLEXIBLE TOUCH-SENSITIVE MATRIX CATHODE RAY TUBE

(76) Inventor: Jean-Chretien Favreau, 2 rue Cazone, 75018 Paris (FR)

( * ) Notice: Subject to any disclaimer, the term of this patent is extended or adjusted under 35 U.S.C. 154(b) by 0 days.

(21) Appl. No.: 09/674,288
(22) PCT Filed: Apr. 30, 1999
(86) PCT No.: PCT/FR99/01029
§ 371 (c)(1),
(2), (4) Date: Jan. 30, 2001
(87) PCT Pub. No.: WO99/57703
PCT Pub. Date: Nov. 11, 1999

(51) Int. Cl.[7] .................................................. G08B 5/00
(52) U.S. Cl. ................ 340/815.4; 340/85.42; 340/815.43; 345/173; 345/176
(58) Field of Search ................. 340/815.4, 815.42, 340/815.43, 815.53, 815.54; 345/173, 176

(56) References Cited

U.S. PATENT DOCUMENTS 6,062,931 A * 5/2000 Chuang et al. ................ 445/24
6,283,812 B1 * 9/2001 Jin et al. ....................... 445/24

* cited by examiner

*Primary Examiner*—Julie Lieu
(74) *Attorney, Agent, or Firm*—Armstrong, Westerman & Hattori, LLP

(57) ABSTRACT

A touch-sensitive matrix cathode ray tube for inputting and displaying data comprising a plurality of carbon nanotubes defining a plurality of pixels and a plurality of inputting elements, which consists of a dot matrix of each dot comprising a pixel and an inputting element, each pixel made up of ends of at least three mutually parallel nanotubes and each transmitting in one of the three primary colours, the input element being constituted of the end of at least a fourth nanotube.

14 Claims, 1 Drawing Sheet

FLEXIBLE TOUCH-SENSITIVE MATRIX CATHODE RAY TUBE

This is application is a 371 of PCT/FR99/01029 filed Apr. 30, 1999.

The present invention relates to a touch-sensitive matrix screen and more specifically to those constructed by using a plurality of nanotubes.

BACKGROUND OF THE INVENTION

Traditionally, in computing, the data inputting is carried out by means of a peripheral unit such as a keyboard or a mouse, while the visualisation is obtained by means of a screen of the cathode tube type or of the liquid crystal or plasma type.

Cathode screens are heavy and bulky, and emit a high radiation that is harmful for the user. The liquid crystal display or plasma screens are less bulky, but they are very fragile and do not offer a very high brightness. Furthermore, field effect flat screens are very expensive because the manufacture is necessarily mainly hand-made.

Generally, the fact that the inputting device is normally separated from the visualisation means produces, in computing, a disjunction between the hand which inputs and the sight which controls, unlike writing on paper, where the hand and the eye operate simultaneously at the same place.

To avoid this drawback, touch-sensitive screens, which allow giving orders to a computer by pointing a finger or a stylus on a screen, have been developed. However, these systems are slow and do not allow a very good resolution, for example when inputting a drawing or a text with the help of a stylus. Furthermore, certain flat screens do not tolerate the local pressure, even though it is minimal, of a finger or of a stylus.

SUMMARY OF THE INVENTION

The aim of the present invention is to eliminate the above mentioned drawbacks by determining a light flexible touch-sensitive matrix screen allowing a precise inputting.

The invention uses a plurality of nanotubes,

As it is known, the nanotubes are tubes formed by carbon foils arranged in hollow concentric cylinders and were discovered in 1991 by Sumio Lijima. As a reminder, a nanotube is a polymer composed only of carbon and it is a unidirectional periodic crystal.

Many articles regarding the manufacture of the nanotubes have been published. One can, for example, consult the journal LA RECHERCHE num. 307, of March 1998, the journal SCIENCE, Volume 282 of Nov. 6, 1998 or the document WO-A-97/19208. One can also consult the following sites on the Internet (having all of them the prefix http://www.) on the subject of the manufacture and applications of the nanotubes, namely archipress.org, cerca.umontreal.ca/science, research.ibm.com/topics, amsci.org/amsci/articles, amsci/articles, and others.

The invention is situated in this context and allows to remedy the limits of the traditional screens and, consequently, to contribute mainly but not exclusively, to a better use of personal and professional computing. The aim of the present invention is first to determine a touch-sensitive matrix screen not having the abovementioned drawbacks. Another aim of the invention is to determine such a touch-sensitive matrix screen that is not very thick and that is flexible and not very fragile.

These aims are reached, according to the invention, with a touch-sensitive matrix screen for inputting and displaying data comprising a plurality of carbon nanotubes defining a plurality of pixels and a plurality of inputting elements.

According to the invention, this touch-sensitive matrix screen consists of a dot matrix of each dot comprising a pixel and an inputting element, each pixel made up of ends of at least three mutually parallel nanotubes and each transmitting in one of the three primary colours, the input element being made up of the end of at least a fourth nanotube.

Advantageously, each point consists of a plurality of nanotube ends of which at least four are made active.

Preferably, the nanotubes of each point are separated and maintained in position by means of a filler that is, for example, made of a plurality of nonactive nanotubes.

Preferably, each pixel includes a multiple of three active nanotubes respectively connected in parallel.

Preferably also, the end of each active nanotube of each pixel is covered by a luminophore of one of the primary colours

BRIEF DESCRIPTION OF THE DRAWING

The invention will be better understood, and other aims, advantages and characteristics of it will appear more clearly from the following description of the preferred embodiments given as non-limiting examples and illustrated in the accompanying drawings, wherein.

DETAILED DESCRIPTION OF EMBODIMENTS OF THE INVENTION

We will now refer to the annexed drawings, which are only illustrative, mainly because the scales are not respected. In fact, the diameter of a nanotube is about twenty nanometres ($20 \times 10^9$ m), while the elementary pitch of a dot is about 0.2 millimetres ($200 \times 10^6$ m).

Figure 1:
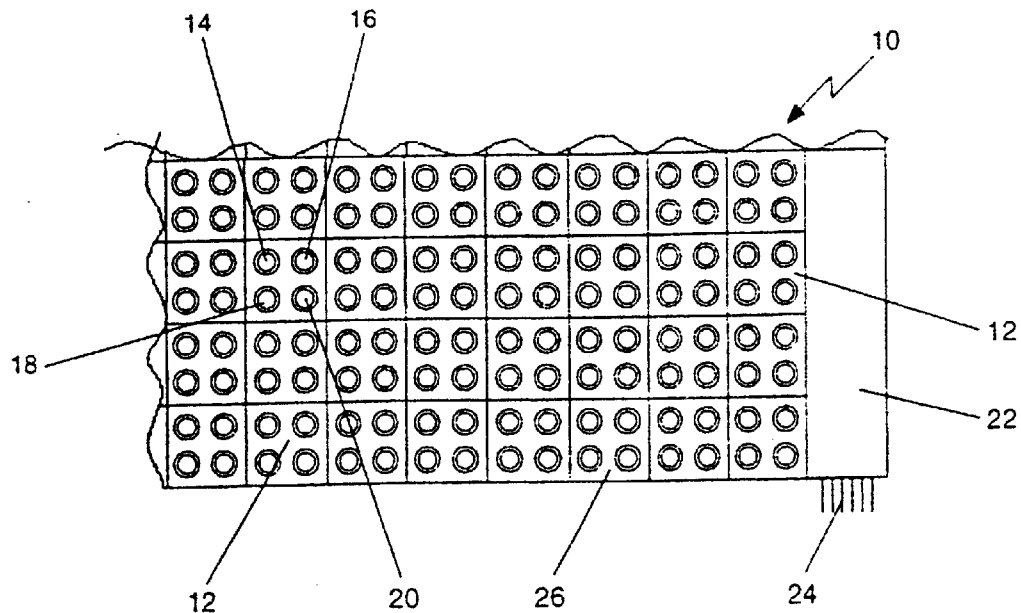
FIG. 1 is a partial schematic representation seen from below of a touch-sensitive matrix screen according to the invention.

In FIG. 1, a corner of a cathode ray tube 10 according to the invention is partially and schematically represented seen from above, that is to say, as seen by the user. This cathode ray tube 10 includes a great plurality of dots 12 substantially but no necessarily squared on one side of about 200 μm.

Each dot 12 includes a pixel and an inputting element.

The pixel is made up of at least one set of three independent parallel nanotubes 14, 16. 18, each emitting in one of the primary colours used in television or computer screens, namely red, green, and blue.

In order to increase the brightness of the resulting cathode ray tube, several nanotubes can be electrically connected in parallel in a same dot 12 and emitting in a same primary colour. In this case, each pixel of each dot 12 includes a multiple of three active nanotubes respectively connected in parallel.

The inputting element is made up of a fourth nanotube 20 whose apparent end operates then as the electrode of a field effect transistor.

In a practical and advantageous way, the non-apparent ends of the nanotubes are directed in group into a collector 22 and connected to a socket 24 forming a connection for a central unit forming a control device and detection device (not represented in the figures).

The active nanotubes 14, 16, 18, 20 of each dot 12 are separated and maintained in position by means of a filler 26. This filler 26 is advantageously made up of a plurality of non-active nanotubes and/or of other nanoparticles such as carbon.

Figure 2:
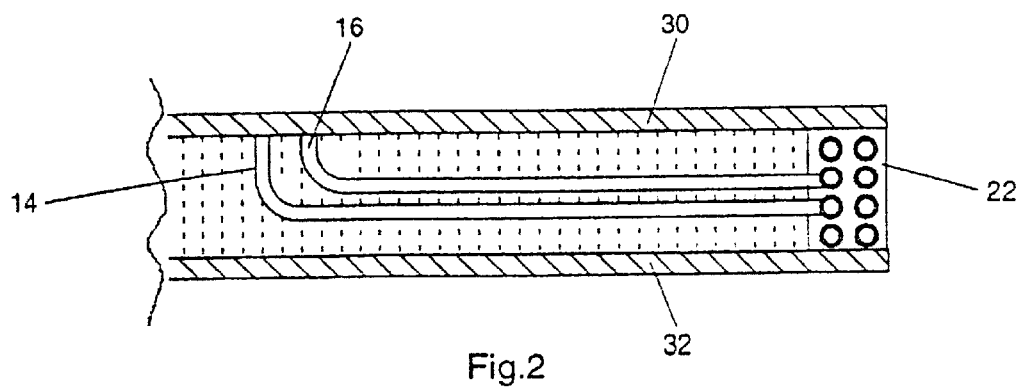
FIG. 2 is a sectional view of the cathode ray tube of FIG. 1 according to a first embodiment of the invention.

According to a first embodiment disclosed in FIG. 2 representing the matrix cathode ray tube of FIG. 1 in a sectional view, wherein only two nanotubes 14 and 16 have been represented, these nanotubes 14,16 are bent in order to form a group of nanotubes whose other ends are connected to the central unit.

A luminescent film 30 is placed on the dots 12 facing the user, mainly to protect them, while a protection sheet 32 is applied on the opposite side.

Figure 3:
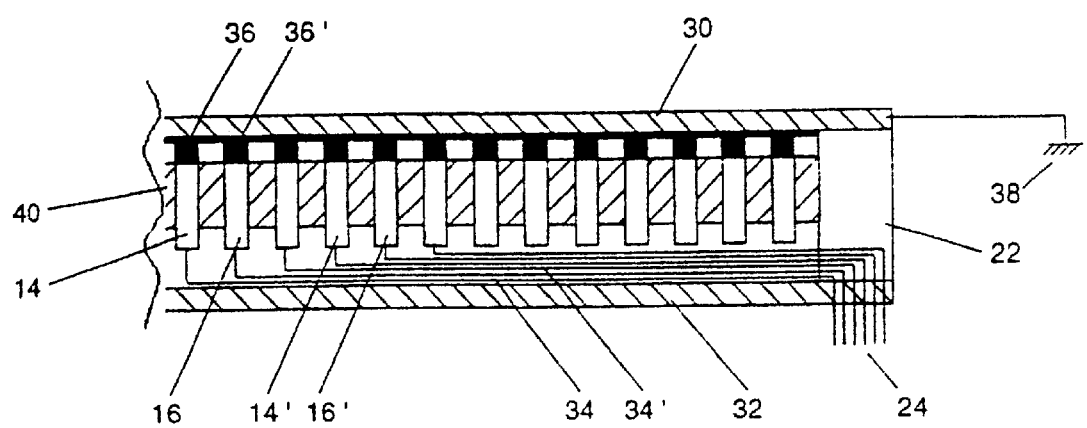
FIG. 3 is a sectional view of the cathode ray tube of FIG. 1 according to a second embodiment of the invention.

According to another embodiment disclosed in FIG. 3 which represents also a schematic sectional view, the cathode ray tube of FIG. 1, the nanotubes 14, 16 14, 16', etc., are arranged in parallel and are not bent. An electric conductor 34, 34' etc. is connected to each nanotube 14, 16 in order to apply the electric voltage required to the non-visible end of the nanotubes. These conductors are reconducted to the connector 24 by means of the collector 22.

A protection sheet 32 is glued to the surface of the conductors 34, 34' on the lower invisible side of the cathode ray tube 10.

The visible end of each of the active nanotubes 14, 16, etc. is covered by a luminophore 36 emitting in one of the three primary colours as described previously.

A transparent plastic film 30 covers the cathode ray tube. This film is electrically insulated from the ends with reference to the nanotubes. It is a conductive film connected to a reference potential, for example, the earth 38, in order to form an anode for the plurality of cathodes made up of the pixel nanotubes.

Preferably, the nanotubes 14, 16, etc. are created directly on and in a sheet woven in carbon fibres which is found under the reference 43 in FIG. 3, since this sheet then acts as support of the nanotubes.

It will be obvious to those skilled in the art that in this way we obtain a touch-sensitive matrix screen 10 having the above-mentioned advantages. Such a cathode ray tube can easily be obtained in all the desired sizes, for example for a roadsign or a hoarding, or for the dial of a watch, or a visualisation screen fixed to a plastic card of the smart card type, eventually with photovoltaic cell allowing an autonomous electric feed.

This screen is not fragile, it is also flexible and can from there be wound on itself when transporting it. Furthermore, the little electric power required for it to function allows using it in a rather hostile environment.

A particular advantage of such a touch-sensitive matrix screen is that it is possible to use it as a table to put, for example, a map or a paper document on it, and to obtain very simply a computing input of the map simply by following the drawn lines by means of a stylus or even a finger.

Although we have represented and described what is presently considered to be the preferred embodiments of the invention, it is evident that those skilled in the art can add different changes and modifications without exceeding the scope of this invention as defined by the annexed claims.

It is clear that the utilisation of such a touch-sensitive matrix screen does not prevent the data inputting by conventional means such as a keyboard, a mouse, or a joystick.

What is claimed is:

1. Touch-sensitive matrix screen for inputting and displaying data comprising a plurality of carbon nanotubes defining a plurality of pixels and a plurality of inputting elements, wherein it consists of a dot matrix of each dot comprising a pixel and an inputting element, each pixel made up of ends of at least three mutually parallel nanotubes and each transmitting in one of the three primary colours, the input element being made up of the end of at least a fourth nanotube.

2. Matrix screen according to claim 1 wherein each dot consits of a plurality of nanotube ends of which at least four are made active.

3. Matrix screen according to claim 1, wherein the nanotubes of each dot are separated and maintained in position by means of a filler.

4. Matrix screen according to claim 2, wherein said filler is made up of a plurality of non-active nanotubes.

5. Matrix screen according claim 1, wherein each pixel includes a multiple of three active nanotubes respectively connected in parallel.

6. Matrix screen according to claim 1, wherein the end of each active nanotube of each pixel is covered by a luminophore of one of the primary colours.

7. Matrix screen according to claim 1, wherein said nanotubes are bent in such a way to form a group of nanotubes, the other ends of which are connected to a central unit comprising a control device of the nanotubes constituting the pixels and a detection device for nanotubes constituting the inputting elements.

8. Matrix screen according to claim 1, wherein said nanotubes are rectilinear and mutually parallel, the ends opposite to said dots being connected to a central unit comprising a control device of the nanotubes constituting the pixels and a detection device for nanotubes constituting the inputting elements.

9. Matrix screen according to claim 1, wherein the surface built by said dots is covered by a transparent plastic film.

10. Matrix screen according to claim 9, wherein said plastic film is a conductive film forming a plurality of anodes in front of the corresponding plurality of ends forming cathode of the nanotubes constituting the pixels and insulated from them.

11. Matrix screen according to claim 9, wherein said plastic film is luminescent.

12. Matrix screen according to claim 1, wherein the nanotubes are created on a sheet woven in carbon fibres.

13. Matrix screen according to claim 2, wherein the nanotubes of each dot are separated and maintained in position by means of a filler.

14. Matrix screen according to claim 10, wherein said plastic film is luminescent.

* * * * *